Nov. 9, 1943.   B. G. CARLSON   2,333,983
INDICATOR CONTROL MECHANISM
Filed May 7, 1942       2 Sheets-Sheet 1

INVENTOR.
BERT G. CARLSON.
BY
ATTORNEY.

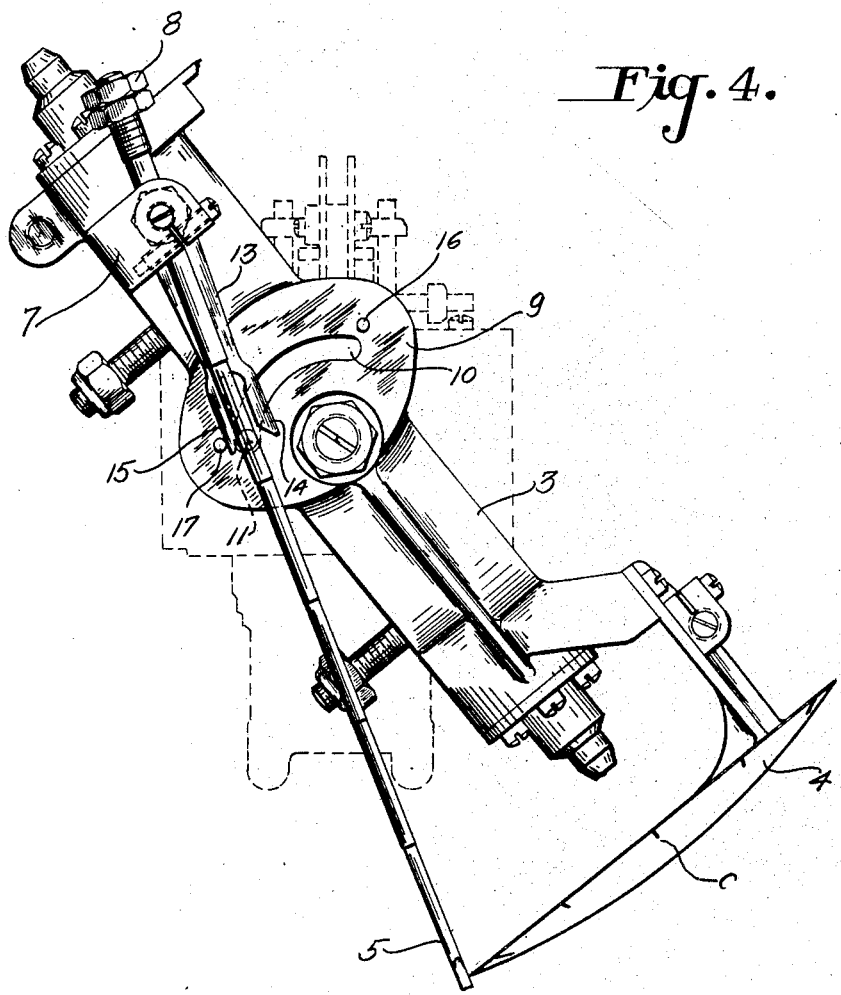

Patented Nov. 9, 1943

2,333,983

UNITED STATES PATENT OFFICE 2,333,983

INDICATOR CONTROL MECHANISM

Bert G. Carlson, Erieside, Ohio, assignor to Jack & Heintz, Inc., Bedford, Ohio, a corporation of Ohio Application May 7, 1942, Serial No. 442,118

1 Claim. (Cl. 33—204)

This invention relates in general to instrument indicators and more particularly to improvements in horizon bars and operating means therefor for gyroscopic aircraft climb indicators.

One of the primary objects of the present invention is to provide an improved climb indicator instrument and horizon bar and operating means therefor whereby the entire limit of movement, from upper to lower limit, of the pointer, will be confined to the usual face of the usual instrument dial without limiting the relative movement of the gyro and its gimbals, and whereby the movement of the horizon bar with respect to the instrument calibration indicia may be so predetermined as to gradually and progressively decrease proportionately as it approaches either top or lower limit from the intermediate normal or zero position.

With the foregoing and other objects in view the invention resides in the combination of parts and in the details of construction hereinafter set forth in the following specification and appended claim, certain embodiments thereof being illustrated in the accompanying drawings, in which:

Figure 4 is a view similar to Figure 2 with the pointer in extreme lower position on the dial and the corresponding relative positions of the assembly.

Referring more particularly to the drawings, a conventional horizon gyro vertical axis air spun gyro wheel is contained within a housing 1 suitably mounted for rotation about a longitudinal axis in an inner ring 2 which in turn is mounted for rotation about a transverse axis in an outer ring 3, these axes having regard to the aircraft carrying the assembly.

Figure 2:
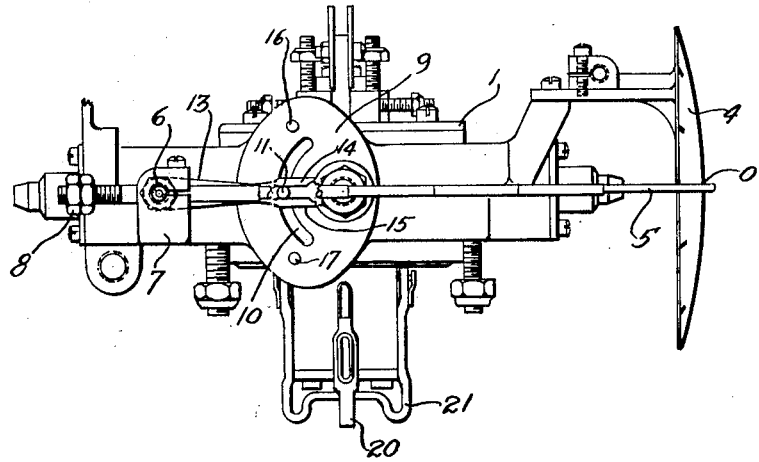
Figure 2 is a view in side elevation of the same in neutral position.
Figure 3:
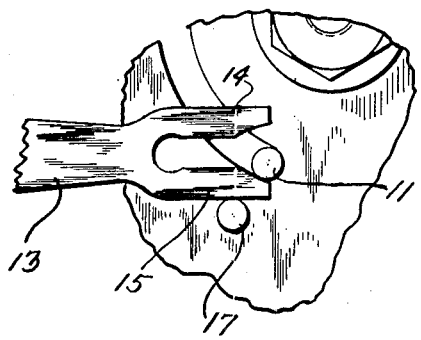
Figure 3 is an enlarged detail view of the prongs of the ring carried forked arm showing the gyro carried pin riding on the lower prong after the lower limit of the horizon bar movement has been reached.

The climb indicator dial 4, for diagrammatically illustrative purposes is not shown enclosed but it will be understood that the full face of the dial is to be visible on the instrument board and that the dial face is to be suitably calibrated from the neutral or zero position midway between the top and bottom. Figure 2 shows the horizon bar 5 in such zero position at 0 indicating level fore and aft attitude of flight, whereas Figure 3 shows the horizon bar registering with the extreme lower position of the dial face to indicate a predetermined amount of descent or dive of the aircraft.

Figure 1:
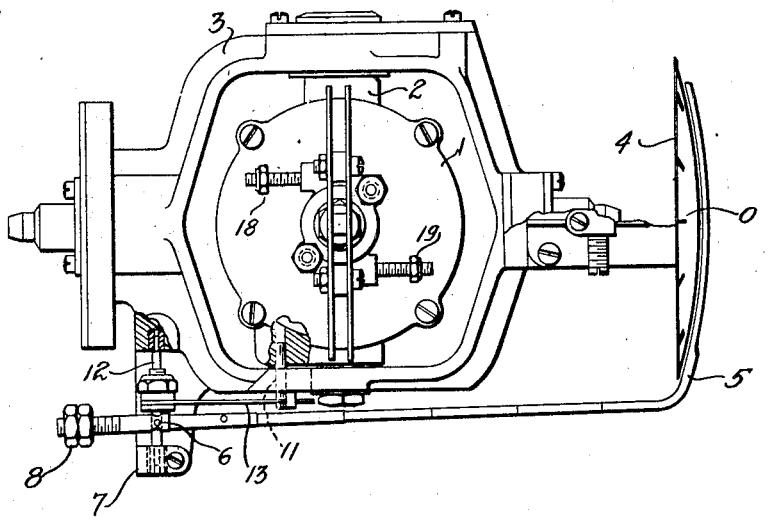
Figure 1 is a bottom plan view, partly in section, of the gyro assembly and gimbal support and showing the climb indicator dial and horizon bar and the operative connections of the latter to the gyro and gimbal.

The horizon bar 5 is pivoted at 6 to an arm 7 of the ring 3 and has its other extremity provided with screw threads to receive adjustable balancing counterweight nuts 8. The ring 3 also has secured thereto or cast integral therewith a plate 9 so that the latter has a fixed relation with respect to the ring 3 and its movements relative to the remainder of the assembly. This plate 9 is provided with an arcuate slot 10 arranged vertically with respect to the normal attitude of the aircraft with the bow of the slot toward the rear. Riding in this slot is a pin 11 which is carried by the gyro wheel housing as indicated in section in Figure 1.

The arm 7 also carries a shaft 12 to receive one end of a forked arm 13 that is held in place by a clamping nut 14 so that the forked arm 13 moves with the outer ring 3. As shown in Figures 2 and 3 the pin 11 as it extends through the arcuate slot 10 of the plate 9 also extends through the space between the fork members or prongs 14 and 15 of the arm 13. Each of the fork members has its inner face arcuately bevelled at 22 and 23 respectively toward the fork extremity. The plate 9 is provided with upper and lower stop pins 16 and 17 which are engaged respectively by prongs 14 and 15 respectively to form the upper and lower limit of travel of the fork. This likewise provides an upper and lower limit of travel of the horizon bar 5. As shown in Figure 2, with the pointer 5 at zero, the pin 11 is in the center of the arcuate slot 10 and in the center of and against the bow of the forked portion of the arm 13.

As is conventional practice, the gyro may have adjustable counterweights 18 and 19 and a fore and aft swinging pendulum 20 and a transversely swinging pendulum 21 to assist spinning gyro wheel in maintaining a true gravitational vertical spinning axis. Thus when the aircraft descends, or dives, it is rocked about its transverse axis so as to point downwardly and this causes the pointer arm to rotate clockwise, as viewed in Figure 4 about its pivot 6. The rate of movement of the arm is regulated by the relative movement of the pin 11 in the fork and slot. The extent and limit of movement of the pointer is fixed by the stop pins 16 and 17 and the abutment thereof by the prongs 14 and 15. Figure 3 shows the pointer registering the maximum aircraft descent attitude reading. Any greater attitude descent will have no moving effect on the pointer because the resulting effect is merely a riding up of the pin 11 on the concave inner face 23 of the outer tip of prong 15 while the latter remains stationary in abutment with pin 17 with the result that the pointer 5 remains stationary and does not move past the lower extremity of the dial where it would merely be out of sight so as to make such movement useless for indicating purposes.

It is to be understood that in an ascending attitude of the aircraft the horizon bar is raised from 0 to a point above the same and that the upper limits are accordingly determined by pin 16 and prong 14 and their relationship to slot 10, prong 14 and pointer 5.

From the foregoing it will be seen that there has been provided a simple and convenient arrangement whereby the relative fore and aft movement of the gyro and the gimbal is indicated by the position of the horizon bar with respect to the indicia on the climb indicator dial and whereby the dial indicia, in order to corresond with the controlled movements of the horizon bar may be calibrated to represent such movement from one eighth of an inch progressively down to zero and the movement of the horizon bar stopped at its upper and lower limits corresponding to the upper and lower extremities of the instrument dial without any binding effect on the gyro or gimbal assembly.

I claim:

In an artificial horizon for aircraft, a rotor bearing frame, a gimbal ring supporting said frame for oscillation about a horizontal axis extending transversely of the aircraft, an outer casing in which said gimbal is pivoted about a fore and aft horizontal axis, a horizon bar pivotally mounted on said gimbal and having the forward end extending at right angles thereto, and means connecting said frame and bar to rock the bar up and down on pitching of the craft, said means comprising a member carried by said gimbal ring and having an arcuate slot therein, a forked element also carried by said gimbal between said member and said horizon bar and a pin carried by said gyro bearing frame eccentric of its gimbal axis and the axis of said bar to pass through said slot and ride in said fork whereby the movement of said horizon bar is controlled by said pin as it rides in said slot, said fork having its extremities bevelled to permit the pin to ride thereon when it reaches its upper and lower limit in said slot permitting relative movement between the rotor frame and gimbal without movement of the horizon bar past the upper and lower limits of the dial.

BERT G. CARLSON.